United States Patent [19]

Hassler et al.

[11] Patent Number: 5,432,549
[45] Date of Patent: Jul. 11, 1995

[54] PROCESS AND DEVICE FOR MEASURING TARGETING IN COLOR PICTURE TUBES

[75] Inventors: Joachim Hassler, Esslingen; Zeljko Sernhorst, Celle; Kurt Ringer, Weyhe, all of Germany

[73] Assignee: Nokia Technology GmbH, Pforzheim, Germany

[21] Appl. No.: 75,669

[22] Filed: Jun. 11, 1993

[30] Foreign Application Priority Data

Jun. 16, 1992 [DE] Germany .................. 42 19 646.9

[51] Int. Cl.$^6$ ................... H04N 17/00; H04N 17/04
[52] U.S. Cl. ............................. 348/191; 348/189
[58] Field of Search ............... 348/180, 184, 189, 190, 348/191, 187; 356/121; 342/404; 315/10; H04N 9/62, 17/00, 17/04

[56] References Cited

U.S. PATENT DOCUMENTS

| | | | |
|---|---|---|---|
| 3,916,437 | 10/1975 | Barbin | 348/191 |
| 4,001,877 | 1/1977 | Simpson | 348/191 |
| 4,137,548 | 1/1978 | Kelly et al. | 348/191 |
| 4,286,164 | 8/1981 | Ragland, Jr. | 250/461.1 |
| 4,602,272 | 7/1986 | Duschl | 348/191 |
| 5,049,791 | 9/1991 | Kawakami | 348/191 |

OTHER PUBLICATIONS

Proc. IEEE Int. Conf. Robotics & Automation 14. Mai 1992, Nice, France Seiten 993–998, XP299852 Z Bien et al. 'Development of an automatic adjustment system for integrated tube components'.
Displays Bd. 7, Nr. 1, Januar 1986, Guildford GB, Seiten 17–29. P Keller 'Resolution measurement techniques for data display cathode ray tubes' Seite 22, "Image disector and diode array scanning methods"*.
Prospectus of the Company, "Innovationstechnik, Bremen".

Primary Examiner—James J. Groody
Assistant Examiner—Glenton Burgess
Attorney, Agent, or Firm—Ware, Fressola, Van der Sluys & Adolphson

[57] ABSTRACT

A process for measuring a targeting of an electron beam that passes through a slot in a shadow mask in a multiple-beam color picture tube and strikes a phosphor stripe on a screen of the tube includes: exciting a luminous stripe in the phosphor stripe, recording an image of the luminous stripe with an image converter, determining outer edges of the phosphor stripe, generating an electron beam in the picture tube to illuminate a luminous spot on the phosphor stripe, recording an image of the luminous spot, determining positions of outer edges by analyzing the image of the luminous spot, and comparing locations of the outer edges of the phosphor stripe with the positions of the outer edges of the luminous spot to determine the targeting of the electron beam. If the respective outer edges do not substantially coincide, then the process includes generating a displaced electron beam with an auxiliary deflector to illuminate a displaced luminous spot having two outer edges perceptible by the image converter, and determining from a width and displacement of the displaced luminous spot the position of the outer edges of the displaced luminous.

5 Claims, 9 Drawing Sheets

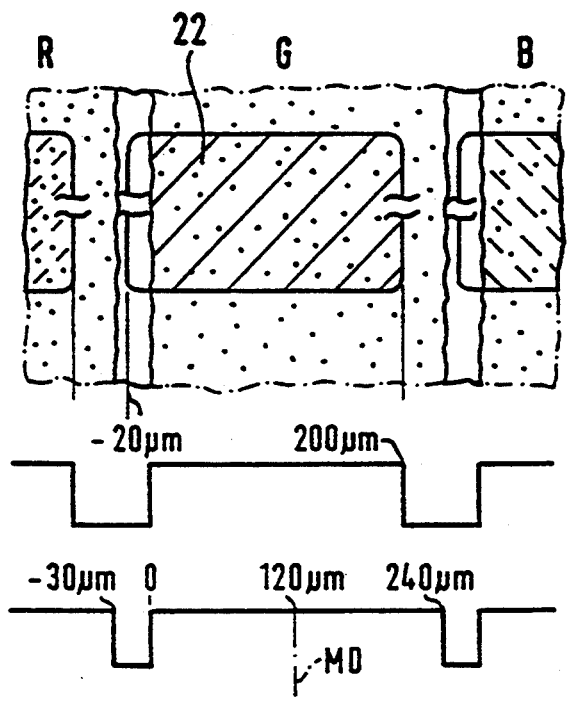
FIG. 3A
FIG. 3B
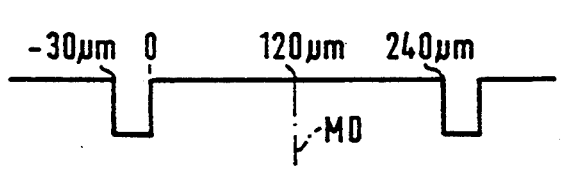
FIG. 3C
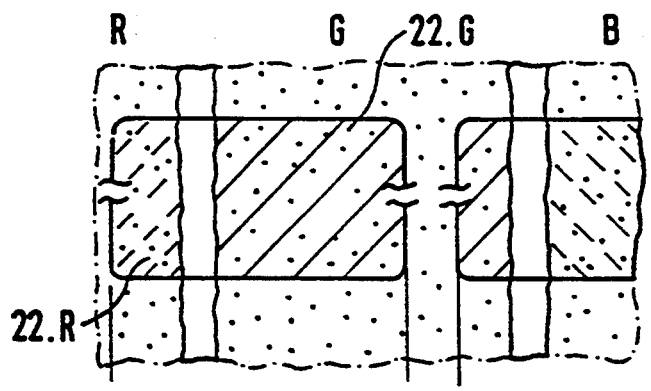
FIG. 4A
FIG. 4B
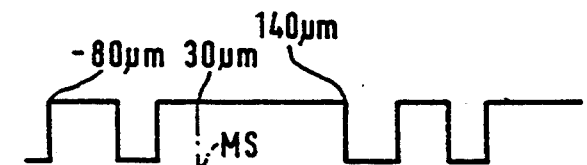
FIG. 4C
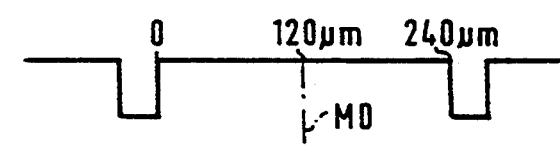

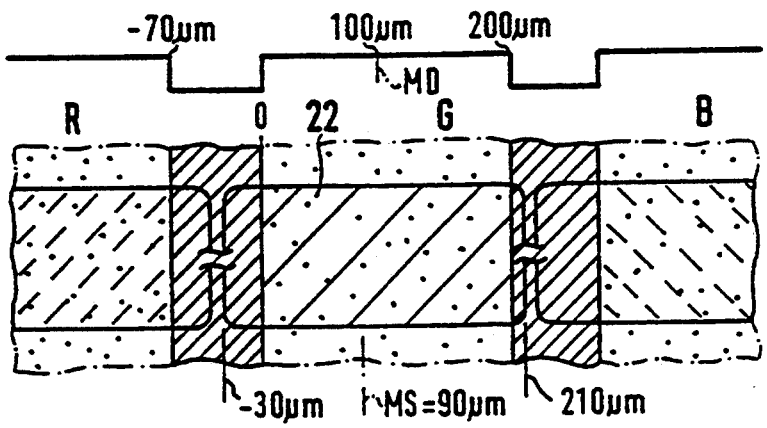
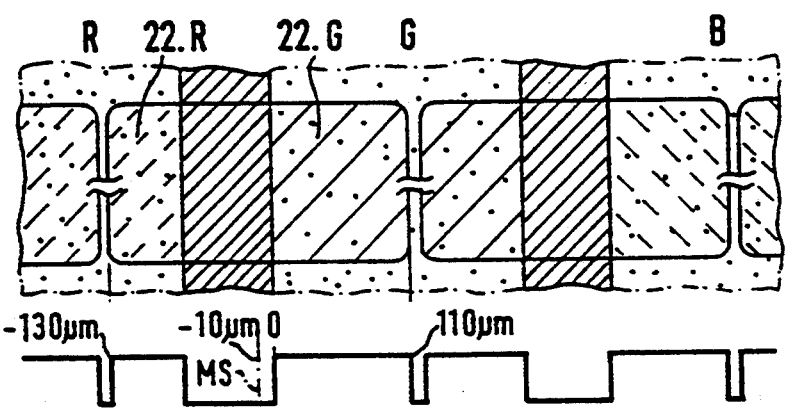
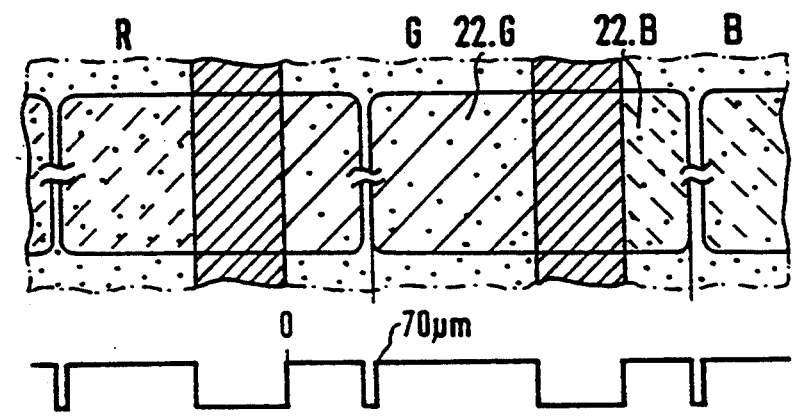

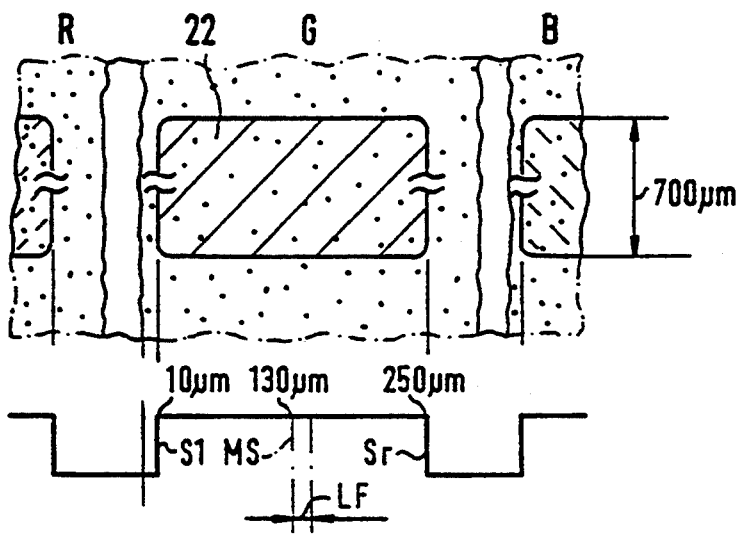
FIG. 13A
FIG. 13B
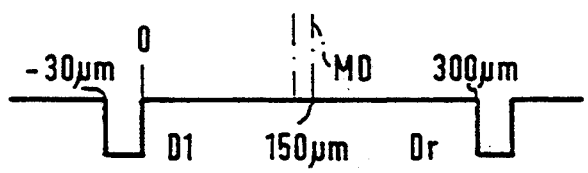
FIG. 14B
FIG. 14A
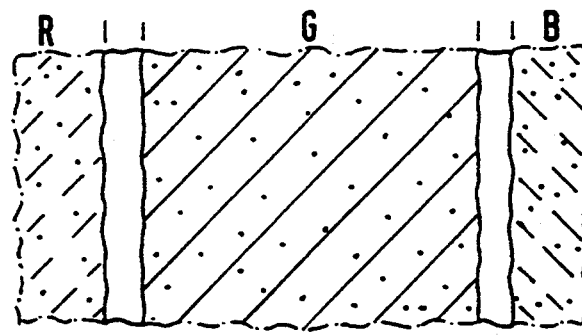
FIG. 15
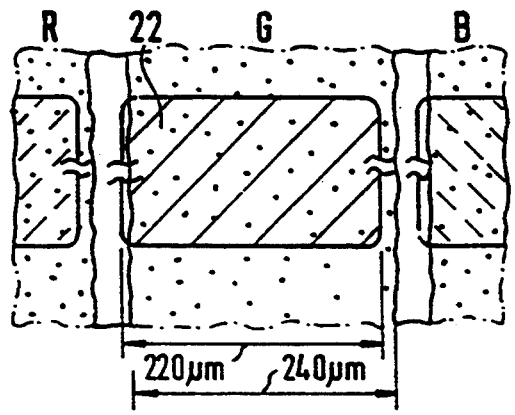

PROCESS AND DEVICE FOR MEASURING TARGETING IN COLOR PICTURE TUBES

Technical Field

The following concerns a process and a device for measuring the targeting of an electron beam that, in a multiple-beam color picture tube, passes through a slot in a shadow mask and strikes a phosphor stripe on the screen of the tube.

The term "targeting" is synonymous with "color purity." A targeting error is typically understood to mean the deviation between the center of the phosphor stripe at the center of the screen, and the center of the electron spot as generated by an electron beam passing through the slot in the shadow mask associated with that phosphor stripe. As the targeting error increases, an outer edge of the electron spot comes closer and closer to the adjacent phosphor stripe, and ultimately reaches it if the targeting error is large. This causes the electron beam to excite luminescence in two adjacent phosphor stripes, which however are of different colors. A large targeting error therefore causes an error in color purity.

Prior Art

FIGS. 11 and 12 illustrate a device for targeting measurement as offered for the last several years by the company styled Innovationstechnik Gesellschaft für Automation m.b.H., Bremen, Del. FIGS. 13 and 14 explain a process that can be performed with this device.

The device comprises a tube driver 10' an analysis arrangement 11' a right image converter camera 12.R, a left image converter camera 12.L, and a sequence controller 13' that controls the sequence in which the aforesaid subassemblies operate. The tube driver 10' drives the electron beam generating system 14 and the deflector 15 of a color picture tube 16. The analysis arrangement 11' has a RAM 17, an analysis logic unit 18' and a display 19. Arranged in each of the two image converter cameras 12.R and 12.L is a CCD image converter 20 (see FIG. 12). A changeover switch 21 actuated by the sequence controller 13' is used to switch between the two image converter cameras.

Data for the CCD image converter 20 are shown in FIG. 12. The charges from the CCD pixels are read into the RAM 17 by means of the sequence controller 13'. The RAM has $2^{18}$ cells (corresponding to the $2^{18}$ CCD pixels), of 8 bits each (256 kilobytes). For better comprehension, FIG. 12 assumed a pseudoaddressing model of 512 RAM cells each in the x and y directions, corresponding to the number and arrangement of the CCD pixels. This depiction makes it immediately evident that the RAM can store information that corresponds to the image transferred from the CCD.

FIG. 13A schematically illustrates a portion of an image recorded by a CCD image converter 20 in one of the image converter cameras 12.R or 12.L. FIG. 13A shows luminous spots 22 inside phosphor stripes R, G and B. However, the image converter perceives only luminous domains, namely the luminous spots 22. When the image converter cameras are in the positions indicated in FIG. 11, these luminous spots are approximately 240 μm wide, with a phosphor stripe width of approximately 300 μm. The height of the luminous spots is approximately 700 μm, but in FIG. 13, as in all the other corresponding attached Figures, they are drawn with their height less than their width. Red-emitting domains are identified by dashed crosshatching extending to the upper right, green-emitting domains by continuous-line crosshatching, and blue-emitting domains by cross hatching extending to the lower right.

FIG. 14A illustrates the case in which luminescence is excited in the entire surface of the phosphor stripes. This is done either with an external UV light source, or by defocussing the electron beams generated by the electron beam generating system 14 to such an extent that the entire width of a phosphor stripe is illuminated.

When the device according to FIGS. 11 and 12 is operated, the image in accordance with FIG. 14A is first recorded by the CCD image converter 20, and then transferred to the RAM 17. Analysis is then performed along one horizontal line of the CCD information, to determine how much charge was stored in the CCD pixels. The charge quantity along the said horizontal line is depicted in highly simplified fashion in FIG. 14B. The signal displaying the charge quantity is high in those segments in which the horizontal line intersects phosphor stripes, while it has a lower value along the path between adjacent phosphor stripes. Since in practice the edges of the phosphor stripes are not very sharp, the actual signal profile is much less clear than the one in FIG. 14B. In practice, therefore, the signal profile is smoothed and differentiation is performed, followed by a threshold comparison, so that the edges between a luminous and non-luminous region can be perceived. In FIG. 14B the left edge of the phosphor stripe G is labeled D1, while the right edge is labeled Dr. The location of the left edge is arbitrarily assigned a value of zero. The right edge is located some 68 pixels farther to the right, which corresponds to a distance of about 300 μm from the left edge. The reason is that each CCD pixel, which is 22 μm wide, represents an image pixel 4.4 μm wide, since the screen image is magnified five times.

As soon as the outer edges of the phosphor stripe G have been defined, the luminous spot image in accordance with FIG. 13A is recorded. An analysis is performed in accordance with the procedure explained with reference to FIG. 14B, resulting in the signal profile according to FIG. 13B. The left outer edge S1 of the luminous spot 22 on phosphor stripe G is located about 10 μm away from the location of the left phosphor stripe edge D1. The right luminous spot edge Sr is at 250 um.

It is evident from the data explained with reference to FIGS. 13B and 14B that the center line MS of the luminous spot 22 is located at approximately 130 μm, while the center line MD of the phosphor stripe G is located at approximately 150 μm. The difference between these two center lines corresponds to a targeting error LF of 20 μm.

The known process thus possesses the following features:

a) Excite luminescence in at least the phosphor stripe on which targeting is to be measured;

b) Record the image of the luminous stripe with an image converter;

c) Analyze the electrical charge pattern generated in the image converter to define the edges, relative to the outer edges of the image converter, along which transitions in the charge quantities are located, thus determining the outer edges of the phosphor stripe;

d) Operate the tube so that the said electron beam will generate a luminous spot on the said phosphor stripe;

e) Record the image of the luminous spot that is actually generated;

f) Analyze the image of the luminous spot to determine the positions of its outer edges; and h) Compare the locations of the outer edges of the phosphor stripe with the positions of the outer edges of the luminous spot, to determine the targeting of the electron beam.

The known device has a tube driver, an image converter arrangement, an analysis arrangement, and a sequence controller, with these subassemblies being designed so that the aforesaid process is implemented.

A prerequisite for the measurement explained above is that the luminous spots 22 lie entirely on the associated phosphor stripes. If this is not the case, as illustrated by FIG. 15, the center of a luminous spot 22 cannot be determined, since the location of one of its outer edges is unknown. FIG. 15 illustrates this case for the center of the tube, where in accordance with the example depicted, the luminous spots are 220 μm wide, and the phosphor stripes only slightly wider, namely 240 μm. Because of this dimensional relationship, a luminous spot will no longer lie entirely on the associated phosphor stripe even if the targeting error is small. Thus the device described above is not suitable, for practical purposes, for measuring targeting at the center of a tube. It is also not suitable for measuring targeting on tubes with larger targeting errors. Lastly, it is completely unsuitable for measurements on matrix tubes, since with such tubes the electron spots are always wider than the phosphor stripes.

SUMMARY OF THE INVENTION

The process according to the invention possesses the features a) to f) and h) listed above, and is characterized in that after step f), the process continues as follows:

g) A determination is made as to whether the outer edges of the luminous spot lie inside the outer edges of the phosphor stripe, and then,
   if this condition is met, step h) is performed;
   otherwise, by means of current through an auxiliary deflector, a displacement and measurement sequence is performed, in which the electron spot generating the luminous spot is displaced at least once so that its two outer edges are unequivocally perceptible, with the respective luminous spot image being recorded and analyzed, from which analysis data the width and displacement of the electron spot and from that the original positions of its outer edges are determined, after which step h) is performed.

The device according to the invention differs from the known one in that an auxiliary deflector by means of which the targeting can be changed is additionally present; and that the sequence controller and analysis arrangement are designed so that they can perform the step g) just mentioned.

The process and the device according to the invention ensure that the position of an invisible electron spot edge can be perceived by means of a displacement and measurement sequence for the electron spot, from which the center of the electron spot and from that in turn its targeting on the phosphor stripe can then be determined.

Preferably, a determination is made as to whether a displacement sequence is necessary. For this purpose, a check is made as to whether a detected outer edge of a luminous spot coincides with a detected outer edge of a phosphor stripe, within measurement accuracy. If this is the case, it is uncertain whether these two edges actually coincide exactly or whether the relevant edge of the electron spot lies in a region in which no phosphor stripe is present. In this case the luminous spot is displaced once. It is in fact displaced twice if initially neither of the two outer edges of the electron spot is unequivocally perceptible. In this case the displacement sensitivity is calibrated by means of the repeated displacement, and this sensitivity is used to calculate back and determine where the electron spot is located when no spot displacement current is being sent through the auxiliary deflector.

BRIEF DESCRIPTION OF THE DRAWINGS

FIGS. 3A, B, C are schematic diagrams explaining a luminous spot image (FIG. 3A) when one outer edge of an electron spot does not fall on a phosphor stripe, and signal profiles for luminous spot measurement along a horizontal line (FIG. 3B) and for a phosphor stripe measurement along the same horizontal line (FIG. 3C);

FIGS. 4A, B, C are depictions corresponding to those of FIG. 3, but for the case in which the electron spot according to FIG. 3 is displaced so far to the left that now both of its outer edges are perceptible as outer edges of a luminous spot;

FIGS. 5A, B, C are depictions corresponding to those of FIG. 3, but for the case in which, in a color picture tube with matrix stripes, neither of the outer edges of an electron beam lies inside a phosphor stripe;

FIGS. 6A, B are depictions corresponding to those of FIGS. 5A, B, but for the case in which the electron spot according to FIG. 5 is displaced so far to the left that its two outer edges are perceptible in the form of outer edges of a luminous spot;

FIGS. 7A, B are depictions corresponding to those of FIGS. 5A, B, but for the case in which the electron spot is displaced so far to the right that its two outer edges are perceptible in the form of outer edges of a luminous spot;

FIGS. 13A, B are depictions corresponding to those of FIG. 3A, B, but for the case in which both outer edges of an electron spot lie within a phosphor stripe;

FIGS. 14A, B are depictions corresponding to those of FIG. 13A, B, but for the case in which a luminous stripe is completely illuminated, so that its outer edges rather than those of a luminous spot can be determined; and FIG. 15 is a depiction corresponding to that of FIG. 3A.

BEST MODE FOR CARRYING OUT THE INVENTION

Figure 1:
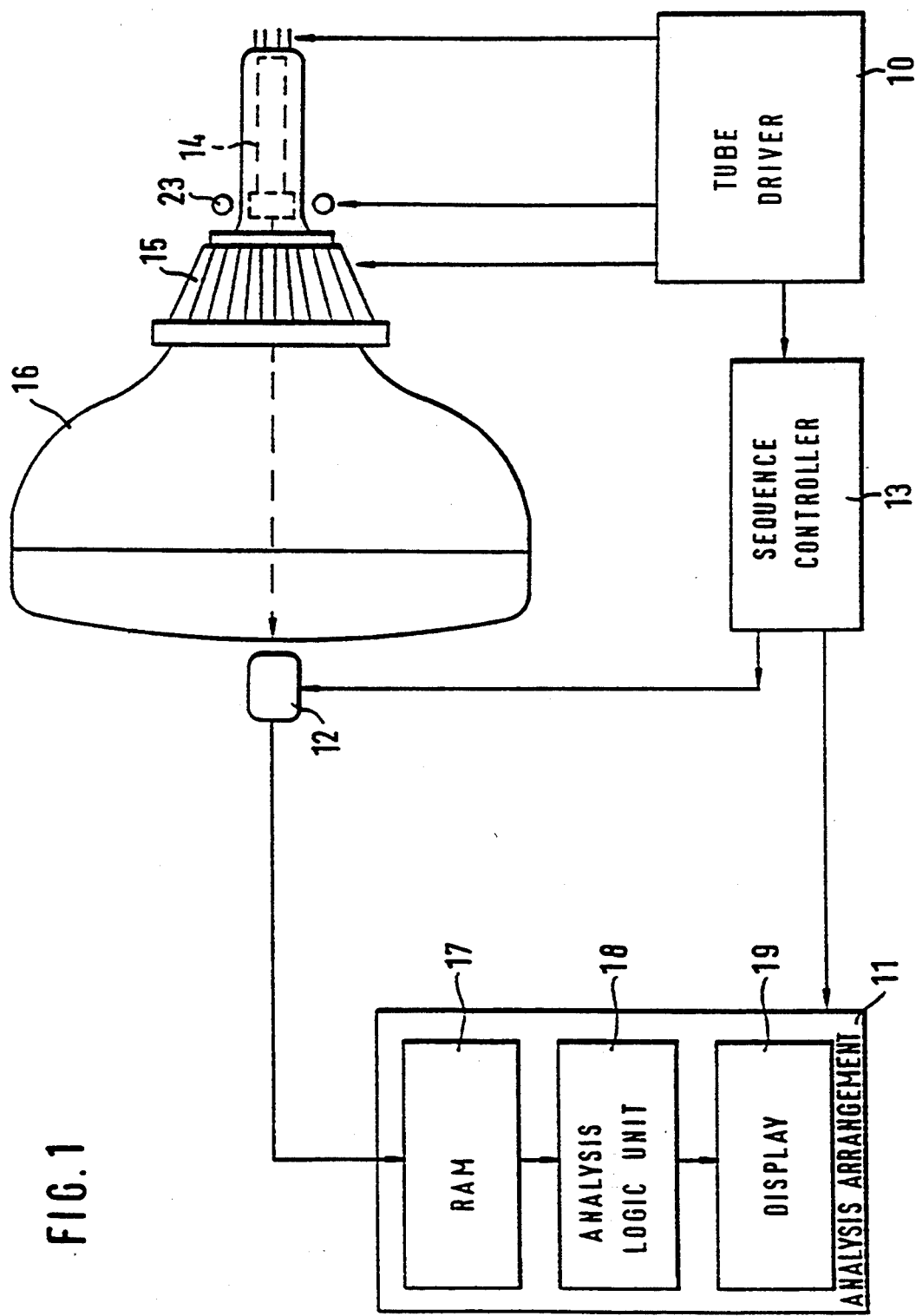
FIG. 1 is a block circuit diagram of a color picture tube and a device for measuring the targeting thereof.
Figure 11:
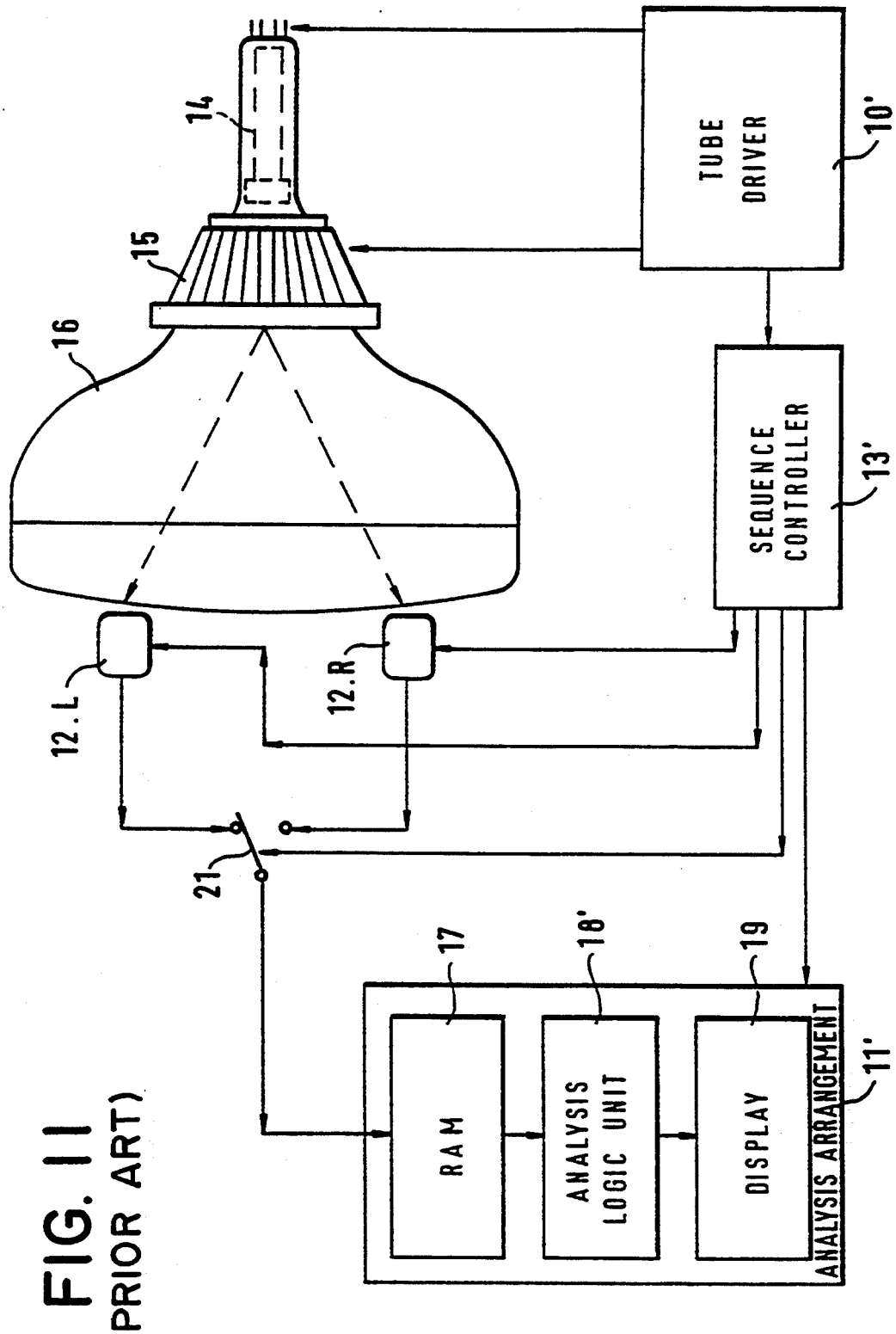
FIG. 11 is a block circuit diagram corresponding to that of FIG. 1, but for a commercially available device.
Figure 12:
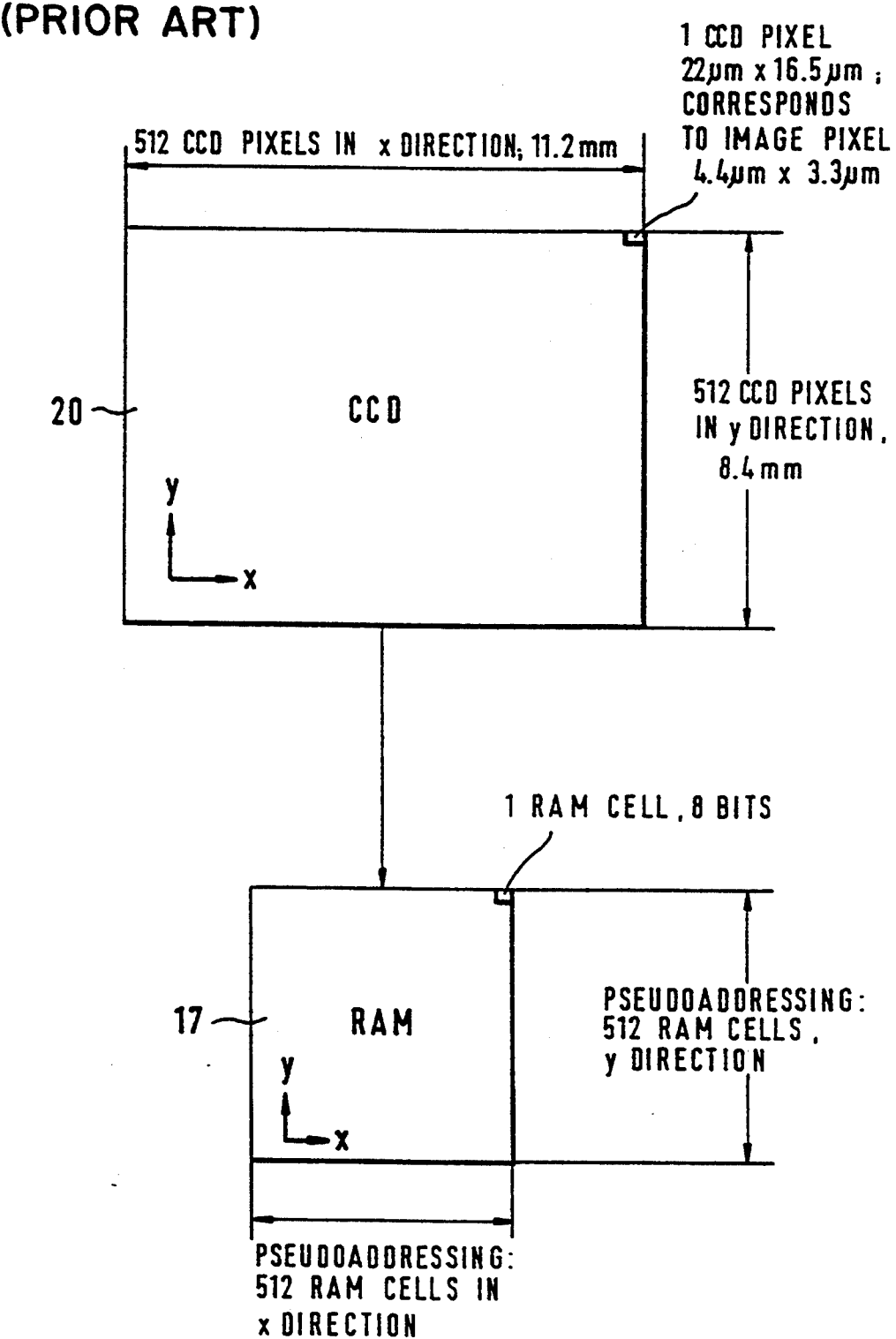
FIG. 12 is a schematic depiction of the pixel distribution in a CCD converter and the pseudoaddressing of a RAM, as used in the device according to FIG. 1.

The device in accordance with the invention according to FIG. 1 is very similar to the commercially available device according to FIG. 11, for which reason only the differences will be discussed here. Arranged near the front end of the electron beam generating system 14 is an auxiliary deflector 23. The tube driver 10 is designed so that, in addition to the electron beam generating system 14 and the deflector 15, it now also drives the auxiliary deflector 23. In the analysis arrangement, the analysis logic unit is designed somewhat differently than in the known device, for which reason the reference numbers 11 and 18 are used rather than 11' and 18'. Moreover, because of the change in design, the sequence controller no longer has the reference number 13' but rather is designated 13. Instead of two image converter cameras, only a single image converter camera 12 is present, arranged in the center of the screen of the color picture tube 16. This depiction with the one image converter camera 12 serves to illustrate the fact that the device according to the invention, and the associated process, can also be used if, almost as a matter of course, electron spots are not perfectly targeted on their respective phosphor stripes. For practical targeting measurements, however, two image cameras 12.R and 12.L will nonetheless often be used; these are arranged on the screen as depicted in FIG. 11, since in positions outside the center of the screen, targeting becomes especially critical as the shadow mask heats up. It is therefore advantageous to measure targeting in these critical domains for a subsequent tube adjustment. Use of the device and the process according to the invention entails the advantage that now all tubes can be tested, regardless of the size of the targeting error and regardless of whether the tubes do or do not have matrix stripes.

Figures 2A, 2B:
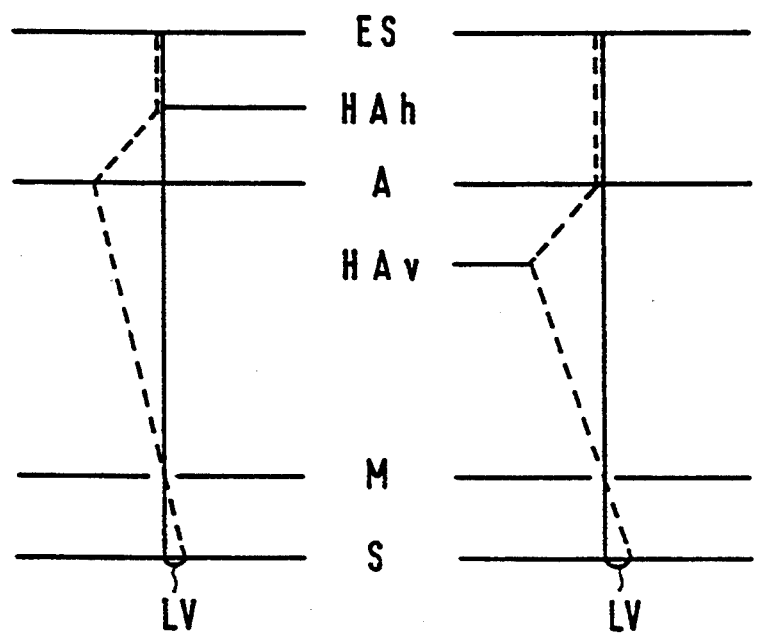
FIGS. 2A, B are schematic diagrams explaining how targeting can be used with the aid of an auxiliary deflector, which can be arranged, looking towards the tube, either behind the deflector (FIG. 2A) or in front of it (FIG. 2B).

FIG. 2 illustrates how the targeting of electron beams on the screen can be changed by means of the auxiliary deflector 23. Drawn in FIGS. 2A and 2B are two electron beams, namely a first beam as a solid, straight line, and a second as a dashed, bent line. It is immediately evident from the two diagrams that a targeting displacement LV can be achieved either by means of an auxiliary deflector whose auxiliary deflection plane HAh is arranged behind the main deflection plane A of the deflector 15, or with one whose deflection plane HAv is arranged in front of the main deflection plane A, in each case viewed towards the screen of the tube 16. An auxiliary deflector 23 arranged behind the deflector 15 can adjust the electron beam with greater accuracy and less physical complexity than an auxiliary deflector arranged in front of the deflector 15, but in practice preference may still be given to an auxiliary deflector arranged in front of the deflector, specifically if the entire space behind the deflector 15 around the tube neck is taken up by a magnetizing arrangement that magnetizes a magnet ring on the electron beam generating system or even two such magnet rings, with the magnetizing currents being determined, for example, on the basis of the targeting measurement results achieved with the device according to the invention.

FIGS. 3 and 4 illustrate how a reliable targeting measurement can be achieved, for the case of targeting according to FIG. 15, with the device according to FIG. 1. In this connection, FIG. 3A corresponds to FIG. 5. FIG. 3C shows the measurement result for determining the position of the outer edges of the phosphor stripe G, corresponding to what is explained with reference to FIGS. 14A and B. The left edge of the phosphor stripe is once again assigned a value of zero. The right edge of the phosphor stripe then lies at 240 $\mu$m, and the center line MD of the phosphor stripe at 120 $\mu$m. FIG. 3B illustrates that the left edge of the luminous spot coincides with the left edge of the phosphor stripe. The reason is that the edge of the electron spot is located even farther to the left, i.e. at the x coordinate minus 20 $\mu$m, although it is not perceptible. The right edge of the electron spot and therefore of the luminous spot is located at 200 $\mu$m.

In the depiction according to FIG. 4A, the electron spot has been displaced to the extent that it now generates two partial luminous spots 22.R and 22.G on adjacent phosphor stripes. Displacement is performed in such a way that both outer edges of the electron spot are unequivocally located within adjacent phosphor stripes. According to FIG. 3C, the separation between adjacent phosphor stripes is 30 $\mu$m. Although it is evident from FIG. 3 that the left outer edges of a phosphor stripe and a luminous spot coincide, it is unclear where the left outer edge of the electron spot lies, for which reason it is assumed that the two outer edges would coincide exactly. A deflection current must then be applied through the auxiliary deflector 23, with this current being unequivocally sufficient to span the 30 $\mu$m separation and displace the left outer edge far enough into the phosphor stripe adjacent to it on the left that an unequivocal measurement is possible. If one wishes to make do with relatively low auxiliary deflection currents, it is also possible to proceed so that the visible right outer edge of the luminous spot and the approximately known width of the electron spot are used to estimate where the left outer edge of the electron spot is very probably located. If this indicates that the left outer edge of the electron spot is already located very close to the right outer edge of the phosphor stripe adjacent on the left, a relatively low auxiliary deflection current can be used to displace the left outer edge of the electron spot unequivocally into the phosphor stripe adjacent on the left.

The measurements according to FIG. 4B indicate that the luminous spot is 140 $\mu$m—($-80$ $\mu$m)=220 $\mu$m wide, and that its right outer edge was displaced 220 $\mu$m$-140$ $\mu$m=60 $\mu$m to the left. It is thus certain that the current center line MS of the luminous spot is located at 30 $\mu$m, and that in the undisplaced state according to FIG. 3, it was located 60 $\mu$m farther to the right, i.e. at 90 $\mu$m. The targeting error, in other words the deviation from the center line MD of the phosphor stripe, is thus 120 $\mu$m$-90$ $\mu$m=30 $\mu$m.

While FIGS. 3 and 4 were used to illustrate a case in which one of the two outer edges of an electron spot is initially not perceptible, FIGS. 5 to 7 concern the case in which both outer edges are not perceptible if the electron spot is not displaced. According to FIGS. 5A and C, phosphor stripes 200 $\mu$m wide, separated from one another by matrix stripes 70 $\mu$m wide, are present. Initially both outer edges of the luminous spot coincide with the outer edges of the phosphor stripe G.

In the case of FIG. 6, all the electron spots have been displaced so far to the left that the two outer edges of the center electron spot in question are unequivocally perceptible by means of associated outer edges of a luminous spot, with these outer edges being located on the adjacent phosphor stripes R and G. The coordinate measured for the left outer edge is $-130$ μm, again with reference to the left outer edge of the phosphor stripe G, while the coordinate measured for the right edge is 110 μm. The luminous spot is thus 240 μm wide, and its vertical center line is located at $-10$ μm. The collected data are, however, not yet sufficient to determine how far this center line MS was displaced to the left, so that its original position can be calculated back from that.

The displacement of the center line MS with respect to the original position would be known if the same displacement of the electron spots were produced, from one tube to another, by applying the same current through the auxiliary deflector 23 in each case. However, the relative positions of the electron generating system 14, deflector 15, and auxiliary deflector 23 vary from one tube to another, with the result that the relationship between the current passing through the auxiliary deflector 23 and the beam displacement is affected by a prediction error of up to approximately 50%. To remedy this shortcoming, the relationship between current passing through the auxiliary deflector 23 and luminous spot displacement is calibrated in the embodiment described here. For this purpose, after the electron spot in question is displaced to the left, as depicted in FIG. 6, it is displaced to the right, yielding the image according to FIG. 7, with two partial luminous spots 22.G and 22.B. The left edge of the luminous spot is now located at 70 μm, which corresponds to a displacement of 200 μm from the position in FIG. 6. In the exemplary embodiment, a displacement of 200 μm required a difference in current through the auxiliary deflector 23 of 600 mA, with a current of 300 mA being applied for the first displacement to the left, and a current of $-300$ mA applied for the second displacement. A displacement of 200 μm to the right resulting from a current difference of $-600$ mA indicates that the current of 300 mA in the first step produced a displacement of 100 μm. With the luminous spot in its position displaced to the left, the center line MS was observed at an x coordinate of $-10$ μm. This center line was initially located 100 μm farther to the right, i.e. at 90 μm. Thus the targeting error, referred to the center line MD of the luminous stripe G located at an x coordinate of 100 μm, is 10 μm (more precisely $-10$ μm, i.e. displaced to the left).

In FIGS. 6 and 7, the luminous spots are positioned so that in both cases, both outer edges of a luminous spot in question are perceptible. It is sufficient, however, if both outer edges are perceptible in only one of the two cases. The width and therefore the position of the center line MS are then determined from the image in which both outer edges are perceptible, while the aforesaid calibration, and hence the conversion to the original position of the center line MS, are performed by displacing the outer edge perceptible in both images.

If both outer edges are perceptible after the two displacements, as depicted in FIGS. 6 and 7, the center line MS of the luminous spot in question does not need to be determined immediately after measuring the image according to FIG. 6; instead, it is also possible to use the images of FIGS. 6 and 7 to calculate the original positions of the outer edges of the electron spot being examined, and to determine the center line MS of the electron spot by means of these outer edges.

Figure 8:
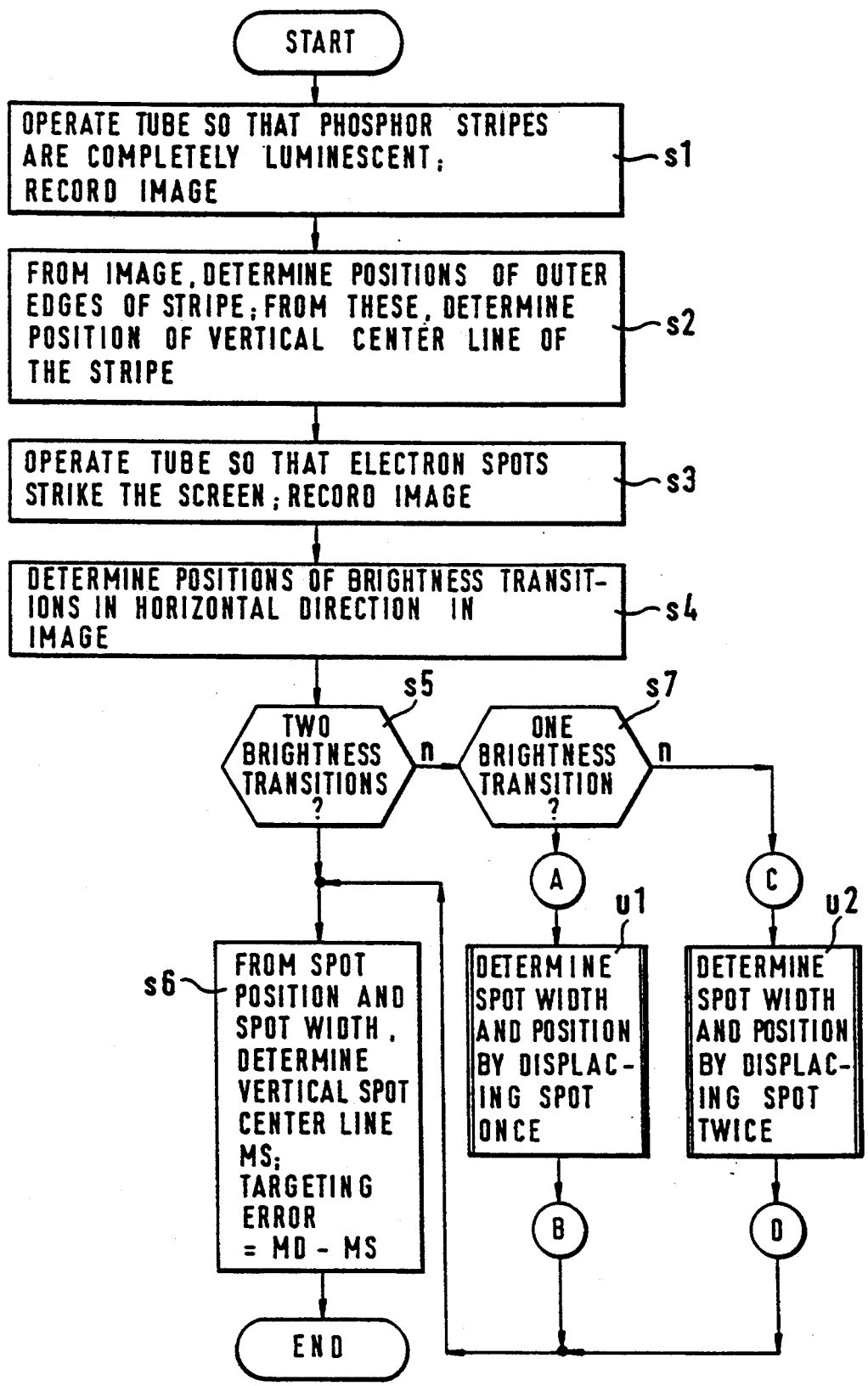
FIG. 8 is a summary flow diagram to explain a process as performed by the device according to FIG. 1.

FIG. 8 illustrates a sequence as preferably implemented by the device according to FIG. 1 so that the targeting can be defined as quickly as possible in all the cases so far discussed, namely that according to FIG. 13A, where both outer edges of an electron spot are perceptible from the start; that according to FIG. 3A, where only one outer edge is perceptible; and that of FIG. 5A, where initially no outer edge appears.

In step s1 of the flow diagram of FIG. 8, the tube is operated so that the phosphor stripes luminesce completely, and the associated image is recorded, as depicted in FIG. 14A. From this image the positions of the outer edges of a phosphor stripe are determined; the position of the vertical center line MD of the stripe follows from this (step s2), as illustrated by FIG. 14B. There now follow steps to determine the position of an electron spot. For this purpose, the tube is operated (step s3) so that electron spots stripe the screen, and a corresponding luminous spot image is recorded. The positions of horizontal brightness transitions in the image are then determined (step s4). If it is found that two brightness transitions are located within one phosphor stripe, which is determined in a step s5, the process ends with a step s6 that contains the process sequence initially described on the basis of FIG. 13. The sequence of steps s1 to s4 and s6 corresponds to the process sequence executed by the device described with reference to FIG. 11.

If it is found, in the newly inserted step s5, that two brightness transitions are not located on one phosphor stripe, the sequence reaches a step s7 in which a determination is made as to whether one brightness transition is located on the stripe. If this is the case, a first subprogram u1 executes between markers A and B; if not, i.e. in the case according to FIG. 5, a second subprogram u2 executes between markers C and D.

Figure 9:
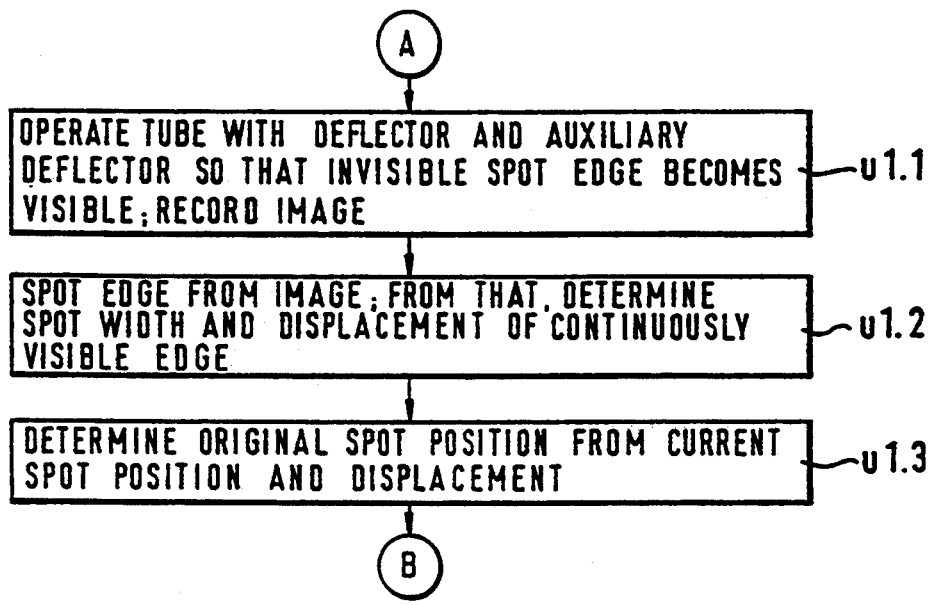
FIG. 9 is a flow diagram for subprogram u1 in the sequence of FIG. 8.

FIG. 9 illustrates the first subprogram u1, divided into three individual steps u1.1 to u1.3. Since the steps in the flow diagram according to FIG. 9 are labeled in detail, and since the sequence corresponds to the one that was described earlier with reference to FIGS. 3 and 4, the description of this sequence will not be repeated here.

Figure 10:
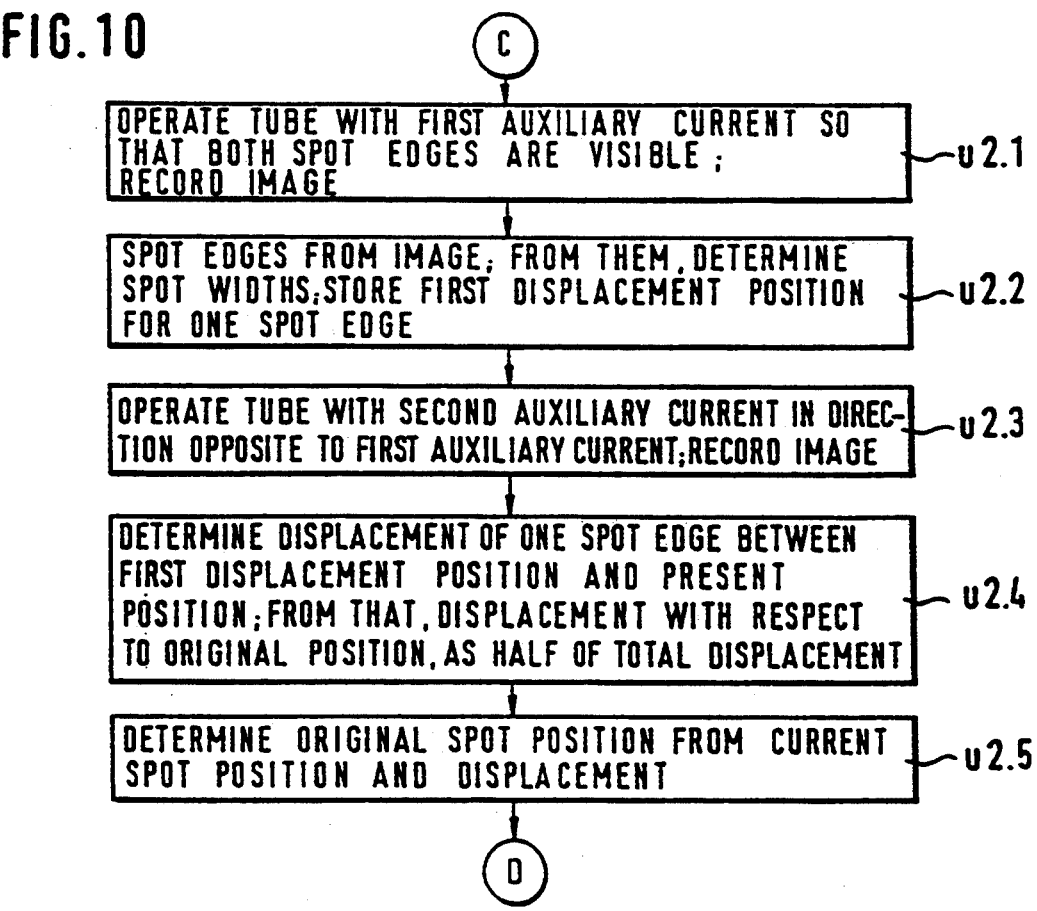
FIG. 10 is a flow diagram for subprogram u2 in the flow diagram of FIG. 8; and concerning the prior art.

FIG. 10 shows the second subprogram u2, divided into five individual steps u2.1 to u2.5. Here again, reference is made to the detailed labels of the flow diagram, supported by the earlier description referring to FIGS. 5 to 7. According to the flow diagram of FIG. 8, execution of the sequence for determining the position of the electron spot depends on how many of its two outer edges are perceptible without displacement of the spot. It is also possible to proceed, however, so that the process sequence always occurs according to the second subprogram u2, i.e. the sequence that produces a reliable result even if no outer edge of an electron spot is originally perceptible. This then eliminates the need to distinguish among cases, although then the most complex sequence is performed even when it is not actually necessary.

We claim:

1. A process for measuring a targeting of an electron beam that passes through a slot in a shadow mask in a multiple-beam color picture tube and strikes a phosphor stripe on a screen of the tube, comprising the steps:

a) exciting a luminous stripe in at least the phosphor stripe on which targeting is to be measured;

b) recording an image of luminous stripe with an image converter;

c) analyzing an electrical charge pattern generated in the image converter to define edges, relative to outer edges of the image converter, along which transitions in charge quantities are located, thus determining outer edges of the phosphor stripe;

d) generating an electron beam in the picture tube so that a luminous spot is illuminated on the phosphor stripe;

e) recording an image of the luminous spot;

f) analyzing the image of the luminous spot to determine positions of outer edges thereof; and h) comparing locations of the outer edges of the phosphor stripe with the positions of the outer edges of the luminous spot to determine the targeting of the electron beam;

characterized in that after step f), the process further includes the step of:

g) determining whether the outer edges of the luminous spot substantially coincides with the outer edges of the phosphor stripe, and then, if this condition is met, performing step h);

otherwise, generating at least one displaced electron beam by passing current through an auxiliary deflector to perform a displacement and measurement sequence to illuminate a displaced luminous spot having two outer edges which are unequivocally perceptible by the image converter, recording and analyzing an image of the displaced luminous spot, determining from a width and a displacement of the displaced luminous spot the position of the outer edges of the displaced luminous, and after which performing step h) using the position of the outer edges of the displaced luminous spot.

2. A process according to claim 1, characterized in that the displacement sequence possesses the following substeps in step (g):

g1) generating a first displaced electron beam by means of a first current through the auxiliary deflector so that two outer edges of a first displaced luminous spot are unequivocally perceptible in the image converter recording and analyzing an image of the first displaced luminous spot, determining from positions of the outer edges of the first displaced luminous spot the width thereof, and storing the value of the width;

g2) storing the value of the first current and the values that characterize the positions of the two outer edges of the first displaced luminous spot;

g3) generating a second displaced electron beam by means of a second current through the auxiliary deflector in a direction opposite the direction of the first displaced electron beam so at least one of two outer edges of a second displaced luminous spot is unequivocally perceptible, recording and analyzing an image of the second displaced luminous spot, and determining a displacement of the outer edges perceptible for the first and second displaced luminous spots in steps g1) and g3);

g4) determining from the displacement in step g3) and the difference between the first and the second current, the original position of the outer edge perceptible in steps g1) and g3), wherein an undisplaced position is a position of the electron beam in the absence of current through the auxiliary deflector; and g5) performing step h) using the position of this outer edge and the width of the luminous spot.

3. A process according to claim 1, characterized in that during the displacement sequence, a check is made as to whether an outer edge of the luminous spot lies within the outer edges of the phosphor stripe, and then, if this is the case, the following steps are performed;

g1) generating a first displaced electron beam by means of a first current through the auxiliary deflector so that two outer edges of a first displaced luminous spot are unequivocally perceptible, recording and analyzing an image of the first luminous spot, determining from the positions of the outer edges of the first displaced luminous spot a width thereof, and storing the value of the width;

g2) storing the value of the first current and the values that characterize the positions of the two outer edges of the first luminous spot;

g3) generating a second displaced electron beam by means of a second current through the auxiliary deflector in a direction opposite the direction of the first displaced electron beam so that at least one of two outer edges is unequivocally perceptible, recording and analyzing an image of a second displaced luminous spot, and determining a displacement of the outer edges perceptible in steps g1) and g3);

g4) determining from the displacement in step g3) and the difference between the first and the second current, the original position of the outer edge perceptible in steps g1) and g3), wherein an undisplaced position is the position in the absence of current through the auxiliary deflector; and g5) step h) is performed using the position of this outer edge and the width of the electron spot;

otherwise displaying the electron beam generating the luminous spot sufficiently so that two outer edges of the luminous spot are unequivocally perceptible on adjacent phosphor stripes, and recording and analyzing with the image converter the image of the displaced luminous spot with reference to the positions of the outer edges of the displaced luminous spot, thus defining the width of the displaced luminous spot and the displacement with respect to the original position, from which data the position of the originally not perceptible outer edge is determined, with which information the analysis according to step h) is then performed.

4. A device for measuring a targeting of an electron beam that passes through a slot in a shadow mask in a multiple-beam color picture tube and strikes a phosphor stripe on a screen of the multiple-beam color picture tube, comprising:

a sequence controller for providing a first electron beam generation signal, for providing a first image converter signal, for providing a first image analysis signal, for providing a second electron beam generation signal, for providing a second image converter signal, for providing a second image analysis signal, and in response to a non-matching analysis signal, for providing a third electron beam generation signal, for providing a third image converter signal, for providing a third image analysis signal;

a tube driver being responsive to the first electron beam generation signal, for driving an electron beam generating means and a deflector in the multiple-beam color picture tube to generate a first electron beam for exciting a luminous stripe in at least the phosphor stripe on which targeting is to be measured;

an image converter being responsive to the first image converter signal, for recording an image of the luminous stripe and generating a first electrical charge pattern signal indicative thereof;

an analysis arrangement being responsive to a first image analysis signal, having a random access memory for storing the first electrical charge pattern signal, and having an analysis unit for analyzing the first electrical charge pattern signal to define edges, relative to outer edges of the image converter, along which transitions in charge quantities are located, for determining outer edges of the phosphor stripe;

the tube driver being responsive to the second electron beam generation signal, for driving the electron beam generating means and the deflector in the multiple-beam color picture tube to generate a second electron beam for illuminating a luminous spot on the phosphor stripe;

the image converter being responsive to the second image converter signal, for recording an image of the luminous spot and generating a second electrical charge pattern signal indicative thereof;

the analysis arrangement being responsive to the second image analysis signal, for storing in the random access memory the second electrical charge pattern signal, and for analyzing with the analysis unit the second electrical charge pattern signal to determine positions of outer edges of the luminous spot, for comparing locations of the outer edges of the phosphor stripe with the positions of the outer edges of the luminous spot to determine the targeting of the electron beam, and for determining whether the outer edges of the luminous spot substantially coincide with the outer edges of the phosphor stripe, and for providing the nonmatching analysis signal if the outer edges of the luminous spot do not substantially coincide with the outer edges of the phosphor stripe;

the tube driver being responsive to the third electron beam generation signal, for driving the electron beam generating means and an auxiliary deflector in the multiple-beam color picture tube to generate a displaced electron beam to illuminate a displaced luminous spot having two outer edges which are unequivocally perceptible by the image converter, the image converter being responsive to the third image converter signal, for recording an image of the displaced spot and generating a third electrical charge pattern signal indicative thereof; and the analysis arrangement being responsive to the third image analysis signal, for storing in the random access memory the third electrical charge pattern signal, and for analyzing in the analysis unit the third electrical charge pattern signal to determine from a width and a displacement of the displaced luminous spot positions of outer edges of the displaced luminous spot, for comparing locations of the outer edges of the phosphor stripe with the positions of the outer edges of the displaced luminous spot to determine the targeting of the electron beam, and for determining whether the outer edges of the displaced luminous spot substantially coincide with the outer edges of the phosphor stripe.

5. A device according to claim 4, wherein the sequence controller provides successive electron beam generation signals, successive image converter signal and successive image analysis signal to the tube driver, the image converter and the analysis arrangement until the outer edges of the displaced luminous spot substantially coincides with the outer edges of the phosphor stripe.

* * * * *